US006661371B2

United States Patent
King et al.

(10) Patent No.: US 6,661,371 B2
(45) Date of Patent: Dec. 9, 2003

(54) OSCILLATOR FREQUENCY CORRECTION IN GPS SIGNAL ACQUISITION

(75) Inventors: Thomas M. King, Tempe, AZ (US); George J. Geier, Scottsdale, AZ (US); Sayfe Kiaei, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 42 days.

(21) Appl. No.: 10/136,084

(22) Filed: Apr. 30, 2002

(65) Prior Publication Data

US 2003/0201935 A1 Oct. 30, 2003

(51) Int. Cl.$^7$ ................................................. G01S 5/14
(52) U.S. Cl. ........................ 342/357.02; 342/357.05; 342/357.12
(58) Field of Search ................. 342/357.12, 357.15, 342/357.02, 357.05, 357.06

(56) References Cited

U.S. PATENT DOCUMENTS

| 4,114,155 | A | 9/1978 | Raab |
| 4,164,036 | A | 8/1979 | Wax |

(List continued on next page.)

FOREIGN PATENT DOCUMENTS

| EP | 000892528 A2 | * | 1/1999 | ......... | H04L/27/227 |

OTHER PUBLICATIONS

Robert P. Denaro, Navstar GPS Test Results and Eric J. Hoffman, et al.; GPSPAC: A Spaceborne GPS Navigation Set; IEEE Plans 1978 Position Location and Navigation Symposium; Nov. 6–9, 1978; which includes the title page, Table of Contents, pp. 1–6 and pp. 13–20.

M. J. Bordel, et al., Texas Instruments Phase 1 GPS User Equipment; The Institute of Navigation, Global Positioning System; vol. 1, pp. 87–102.

Larry L. Horowitz, Analysis Of A Single–Bit Digital Receiver For Carrier And Code Tracking; The Johns Hopkins University—Applied Physics Laboratory; Jul. 1976, Copy No. 59, pp. 5–139.

B. G. Glazer, GPS Receiver Operation; Navigation Journal of the Institute of Navigation; vol. 25, No. 2, Spring 1978; pp. 173–178.

Charles C. Counselman III et al., Miniature Interferometer Terminals For Earth Surveying; Massachusetts Institute of Technology; pp. 139–163.

(List continued on next page.)

*Primary Examiner*—Gregory C. Issing
(74) *Attorney, Agent, or Firm*—Brian M. Mancini

(57) ABSTRACT

A method (50) for correcting oscillator frequency error in GPS signal acquisition includes a first step (52) of receiving at least one broadcasted GPS signal. A next step (54) includes estimating a plurality of Doppler offsets. A next step (56) includes correlating the signal to produce a Doppler modulation for each of the plurality of Doppler estimates. A next step (58) includes calculating a magnitude separation of peak and null states of each modulation. A next step (60) includes searching the peak and null separation to finding the Doppler estimate producing the largest magnitude separation in peak and null states. The found Doppler estimate defines a frequency error estimate for the at least one broadcasted GPS signal, which will be common across all satellites.

20 Claims, 8 Drawing Sheets

U.S. PATENT DOCUMENTS

| | | | |
|---|---|---|---|
| 4,291,409 A | | 9/1981 | Weinberg |
| 4,426,712 A | | 1/1984 | Gorski-Popiel |
| 4,578,678 A | * | 3/1986 | Hurd .................... 342/357.12 |
| 4,870,422 A | | 9/1989 | Counselman |
| 5,043,736 A | | 8/1991 | Darnell |
| 5,194,871 A | | 3/1993 | Counselman |
| 5,343,209 A | | 8/1994 | Sennott |
| 5,365,450 A | | 11/1994 | Schuchman |
| 5,384,574 A | | 1/1995 | Counselman |
| 5,654,718 A | | 8/1997 | Beason et al. |
| 5,663,734 A | | 9/1997 | Krasner |
| 5,663,735 A | | 9/1997 | Eshenbach |
| 5,798,732 A | * | 8/1998 | Eshenbach ............. 342/357.12 |
| 5,812,087 A | | 9/1998 | Krasner |
| 5,841,396 A | | 11/1998 | Krasner |
| 5,917,444 A | | 6/1999 | Loomis |
| 5,943,606 A | * | 8/1999 | Kremm et al. ............. 455/12.1 |
| 5,945,944 A | | 8/1999 | Krasner |
| 5,982,324 A | | 11/1999 | Watters |
| 6,002,363 A | | 12/1999 | Krasner |
| 6,041,222 A | | 3/2000 | Horton |
| 6,061,018 A | | 5/2000 | Sheynblat |
| 6,064,336 A | | 5/2000 | Krasner |
| 6,088,348 A | | 7/2000 | Bell |
| 6,097,974 A | | 8/2000 | Camp |
| 6,107,960 A | | 8/2000 | Krasner |
| 6,111,540 A | | 8/2000 | Krasner |
| 6,121,923 A | | 9/2000 | King |
| 6,122,506 A | | 9/2000 | Lau et al. |
| 6,133,871 A | | 10/2000 | Krasner |
| 6,133,873 A | | 10/2000 | Krasner |
| 6,133,874 A | | 10/2000 | Krasner |
| 6,191,731 B1 | | 2/2001 | McBurney et al. |
| 6,208,290 B1 | | 3/2001 | Krasner |
| 6,208,292 B1 | | 3/2001 | Sih et al. |
| 6,236,354 B1 | | 5/2001 | Krasner |
| 6,295,024 B1 | | 9/2001 | King et al. |
| 6,300,899 B1 | | 10/2001 | King |

OTHER PUBLICATIONS

Charles C. Counselman III et al., Miniature Interferometer Terminals For Earth Surveying; Massachusettts Institute of Technology; pp. 65–85.

Charles C. Counselman III et al., Miniature Interferometer Terminals For Earth Surveying: Ambiguity and Multipath with Global Positioning System; IEEE Transactions on Geoscience and Remote Sensing; vol. GE–19, No. 4, Oct. 1981; pp. 244–252.

Charles C. Counselman III et al., The Macrometer: A Compact Radio Interferometry Terminal For Geodesy With GPS; Macrometrics, Inc.; pp. 1165–1172.

T. Thompson, Performance Of The Satrack/Global Positioning System Trident I Missile Tracking System; The Johns Hopkins University, Applied Physics Laboratory; 1980 IEEE; pp. 445–449.

MIkko Kokkonen, et al., A New Bit Synchronization Method for a GPS Receiver; 2002 IEEE; pp. 85–90.

Charles C. Counselman III et al., Accuracy of Baseline Determinations By Mites Assessed By Comparison With Tape, Theodolite and Geodimeter Measurements; EOS; vol. 62, No. 17, Apr. 28, 1981; p. 260.

* cited by examiner

OSCILLATOR FREQUENCY CORRECTION IN GPS SIGNAL ACQUISITION

FIELD OF THE INVENTION

The present invention relates generally to Global Positioning System (GPS), and more specifically, to improved signal detection acquisition time and low-level signal detection for GPS receivers.

BACKGROUND OF THE INVENTION

According to the Federal Communications Commission (FCC) cellular radiotelephone calls must be geographically locatable. This capability is desirable for emergency services systems such as E911. The FCC requires stringent accuracy and availability performance objectives and demands that cellular radiotelephones be locatable within 50 meters 67% of the time, and 150 meters 95% of the time for handset based solutions, and within 100 meters 67% of the time and 300 meters 95% of the time for network based solutions. Even this relaxed threshold for network-based solutions has been difficult to achieve using traditional TOA/TDOA (Time Of Arrival/Time Difference Of Arrival) infrastructure technology.

In order to include Global Positioning System (GPS) in wireless portable devices such as cellular radiotelephones; performance needs to be improved in several areas including weak signal detection, acquisition time and energy use for operating power. Regarding weak signal detection, users of cellular radiotelephones have become accustomed to making calls indoors, and traditional processing of GPS signals will not accommodate the attenuation caused by most buildings. Since these GPS receivers capture signals from satellites at quite an extraordinary distance, any objects in the direct line of sight between the GPS receiver and the satellites often cause a malfunction because the signal transmitted by the satellites is attenuated by the interfering object making it difficult for the GPS receiver to receive them. Trees, buildings, and other high-profile objects can cause line of sight interference resulting in the problem of weak or low signal detection.

Regarding accuracy, differential GPS approaches may work but are complex and costly. Moreover they don't address the weak signal problem. This major problem with traditional GPS signal processing techniques involves bandwidth and signal power. The GPS satellites transmit a very weak signal; guaranteed signal levels are only −130 dBm on the surface of the earth. Actual signals as measured on the earth's surface show signal levels of about −125 dBm. The acquisition threshold of current automotive and consumer grade handheld GPS receivers is on the order of −137 dBm, thus the link margin for signal acquisition is only about 7 to 12 dB.

A sequential detection algorithm is used by almost every GPS receiver on the market in order to acquire the spread spectrum signals of the GPS satellites. One can extend the acquisition threshold to lower levels by lengthening the pre-detection integration (PDI) interval at the expense of acquisition time. Even so, there is a maximum PDI of about 12 milliseconds (83 Hz bandwidth) beyond which the sequential detection process breaks down. This is because the GPS signal structure includes BPSK modulated fifty bits-per-second (50 BPS) navigation data transmitted on top of the 1.023 MHz spreading code that ultimately limits how long one can coherently integrate in order to increase the SNR. Beyond 20 ms (one data bit time), the data bit transitions cause the integration sum to be reduced or sum to zero, depending on the phase relationship of the integration period relative to the data bit transition.

Another problem is that contemporary GPS receivers are often embedded, within portable devices where energy is derived from a battery. These portable devices include devices such as cellular radiotelephones, PDAs (Personal Digital Assistants), portable computers, surveying devices and other devices that make use of information provided by a GPS receiver. When these GPS receivers operate, they consume a substantial amount of energy, which depletes energy from the battery that could be made use of by the co-embedded functions. If GPS correlation can be done faster, battery energy can be conserved because the GPS receiver can be turned off when correlation is achieved. Prior art schemes have inadequately addressed energy conservation.

Yet another problem involves inaccurate internal reference oscillators in GPS receivers, which increases correlation times. Oscillator inaccuracy increases satellite signal acquisition times by increasing the Doppler search space. Others have therefore endeavored to provide accurate reference oscillators, especially low cost oscillators, for GPS receivers. One solution has used the stored oscillator temperature characteristic data to match reference and GPS oscillator frequencies. Another solution uses stored temperature frequency offset data for subsequent GPS signal acquisition. However, these solutions are still not accurate enough and require additional memory. Still another solution uses a precision carrier frequency signal from a terrestrial network to generate a reference signal for calibrating a local oscillator used by a GPS receiver. And another solution freezes the oscillator correction signal when the GPS receiver makes position determinations. Still another solution uses a precision carrier frequency signal from a terrestrial network to generate a reference signal for controlling a local oscillator signal to a GPS receiver. However, these solutions require added hardware systems and are computationally complex.

What is needed is an improved GPS signal acquisition method and system that can operate with weaker signals and lock onto satellite signals faster than prior art schemes, particularly for E911 calls. Moreover, it would be of benefit to provide a simple method to correct for oscillator error in a GPS system.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
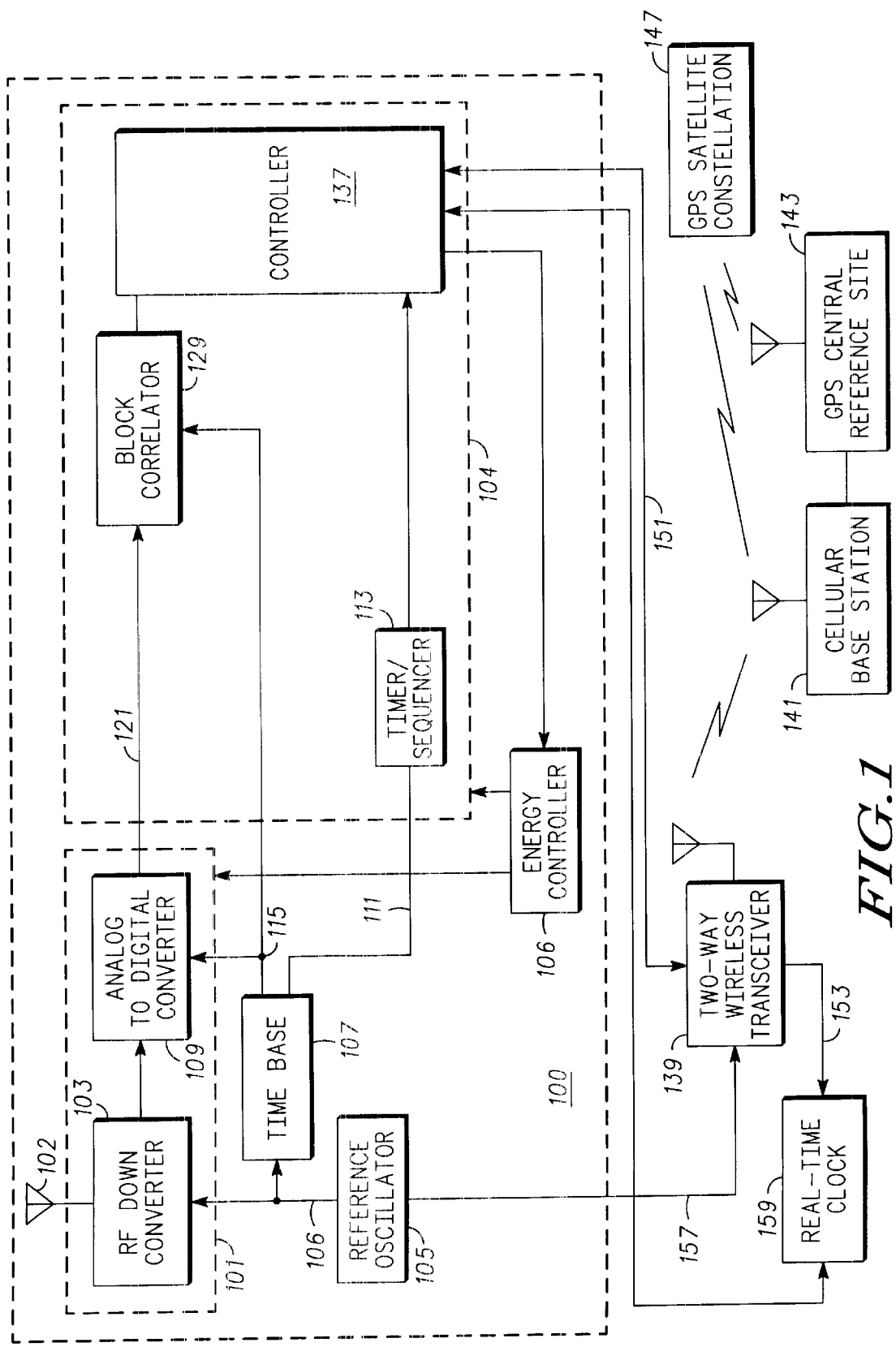
FIG. 1 is a system block diagram of a GPS receiver, in accordance with the present invention.

The present invention provides an improved system and method of aided GPS signal acquisition. Significant signal detection improvement is accomplished by capturing and operating coherently on captured GPS- satellite signals, through use of improved oscillator accuracy. In this way, weaker signals can be detected over the same pre-detection integration interval as previously used for stronger signals. Correlation can be further improved by relying on the predictability of the satellite signal's data pattern. By applying the improved techniques described below, position-determining data can be acquired in weak signal areas without unnecessarily increasing correlation times. This allows for energy conservation—an important feature in portable devices, and makes E911 service viable in a portable product.

Before delving into the precise embodiments, an overview of several aspects of the improved method and system approach taught will be presented. The method and system consists of a wireless communications receiver, such as a GPS enabled radiotelephone that communicates with an infrastructure for both voice and data as well as to exchange data between a GPS sensor and the GPS central reference site (CRS), that is geographically located within a few hundred kilometers.

In some applications, the radiotelephone has knowledge of the visible satellites, their approximate Doppler frequency, and in some cases, the approximate code phase delay and phase/polarity of the 50 bits per second (BPS) navigation message bits. This knowledge can come from locally stored ephemeris, almanac, approximate position, and time, or from other sources, for example, the IS-801 GPS specification provides satellite visibility, Doppler, phase delay at a particular epoch time. In particular, information transmitted to the wireless communications receiver includes time-tagged GPS information such as which satellites are visible at the CRS, and their associated Doppler and code phase. The Doppler and code phase can be transmitted at a single instant in time to a single mobile user, or periodically broadcast to all mobiles as coefficients to a curve fit so that the wireless communications receiver can reconstruct a model of the parameters as a function of time, as is known in the art.

The wireless communications receiver has signal processing elements that sequentially or in a block parallel fashion search out the code phase and Doppler space of the GPS signal in order to find maximum correlation to each visible satellite. The receiver can use aiding information sent by the CRS to greatly limit the search space necessary to find the signal. The wireless communications receiver can be a CDMA radiotelephone, TDMA radiotelephone, GSM radiotelephone, iDEN radiotelephone, or two-way paging device in which accurate time is known. For example, the CDMA radiotelephone has GPS System time available inside the handset because the CDMA infrastructure transmissions are all synchronized with GPS system time. The wireless communications receiver transfers this system time into the radiotelephone and makes it available to GPS receiver, perhaps through a local real-time clock. The aiding information that is sent from the GPS central reference site is time synchronized with GPS time so that the same time reference is used at each end.

The time reference in the wireless communications receiver is the same as that at a cellular base station, but the transmission time delay between the base station and the wireless communications receiver is not considered. Thus, the time reference clock in the wireless communications receiver is delayed in time from the reference clock in the GPS central reference site (and cellular base station) by the propagation time between the cellular base station and the wireless communications receiver. The time delay, or code phase difference, of the GPS signal as measured at the wireless communications receiver and cellular base station is also a function of the offset geometry of the locations of the satellite and the wireless communications receiver.

Reference data provided by a GPS central reference site can be used to significantly speed up the position determination process for the radiotelephone. The reference data transmitted can include code phase, Doppler, and either satellite position information (in the form of ephemeris) or satellite azimuth/elevation angle data so that the wireless communications receiver can narrow the code phase search space to find the satellite signal(s) quickly. The aiding data can also be in the form of GPS satellite ephemeris data, approximate position location of the wireless communications receiver, and approximate time information so that the wireless communication receiver can internally compute satellite visibilities, Doppler estimates, and code phase estimates that are used to narrow the search for GPS satellites. Note that the term radiotelephone is used to represent a combination of the GPS receiver and the radiotelephone (such as a CDMA device or another type of wireless communications receiver, such as a pager) which are assumed to be mounted for example in a vehicle or carried as a portable device by a user. The process by which the code phase and Doppler measured at the central reference site assists the mobile in predicting the code phase and Doppler measurement in the mobile is known in the art. The process by which the Ephemeris, approximate position, and approximate time delivered to the mobile can be used to predict the code phase and Doppler measurements in the mobile is also known in the art.

A system block diagram of a GPS receiver 100 capable of detecting signals at reduced levels is shown in FIG. 1. A GPS front-end 101 includes an antenna 102 coupled to a RF (Radio Frequency) down converter 103. The RF down converter 103, under the direction of a reference oscillator 105 drives an analog to digital converter 109. The RF down converter 103 receives GPS signals broadcasted by any of several satellites in sight, and a time base 107 schedules the analog to digital converter 109 to provide a digitized signal 121 as well as providing proper clocking signals to the block correlator 129 and timer/sequencer 113. The block correlator is one in which, for each satellite selected, can test multiple code phase delays and multiple Doppler frequencies simultaneously. The digitized signal 121 is an Intermediate Frequency (IF) signal.

A computational back-end 104 includes the block correlator 129, the timer/sequencer 113, and a microprocessor/ controller 137 for receiving and processing the digitized signal 121. A timer/sequencer 113 receives a timing reference signal 111 from the time base 107. The time base 107 also provides a timing signal to direct the operation of the analog to digital converter 109 and the block correlator 129. Note that the correlator is a correlator as is conventional in GPS receivers. Each channel of the multiple channels tracks a particular satellite signal extracted from the digitized signal 121. In operation, a portion of the digitized signal 121 is correlated to a code replica that is generated or stored in the correlator 129 under the control of controller 137, and a code phase delay and Doppler shift is determined. In particular, the controller 137 checks to see if the correlation process is detecting the digitized signal using a real-time correlation process. To detect the signal, the correlation process must line up the portion of the digitized signal to the code replica by advancing or retarding the delay of the code replica until maximum correlator output is achieved. If the signal 121 is too weak or the ambient noise level is too high the correlation process will not detect.

When received satellite signals are of a sufficient strength, GPS signal processing proceeds in accordance with the present invention, as will be described below, to acquire and track the satellites continuously. In addition, the correlator(s) 129 can run at real-time speeds or at much faster than real-time speeds. Further, a typical correlator can contain up to twelve channels of independent correlators, that look for a limited number of satellites, or to search in parallel for the same satellite at either different Doppler frequencies or at different code phase delays.

In order to detect weak signals, a combination of coherent and non-coherent integration is used. The time period of coherent integration is referred to as the pre-detection integration period, or PDI. In general, the longer the integration coherent integration period, the more signal processing gain is achieved. Coherent integration of spread spectrum signals is known to enhance signal detection by approximately 3 dB per doubling of the integration period. Non-coherent integration is known to enhance signal detection by approximately 2 to 2.5 dB per doubling of the non coherent integration period. Thus, there is an advantage to extending the detection threshold by coherent integration but there are limits to the practical application of this approach. As one lengthens the PDI, there is a narrowing of the effective bandwidth (to 1/PDI). As one narrows the frequency search bandwidth, more frequency bins are created that have to be searched during the two-dimensional detection scan over the code-frequency space. This increases the time to search for and lock onto the satellite signal. Moreover, the stability of the reference oscillator comes into play at longer integration times if the bandwidth is narrowed enough to approach the short-term stability of practical focal oscillators. Therefore, at low signal levels that require longer integrations, oscillator accuracy and stability becomes very important.

Figure 2:
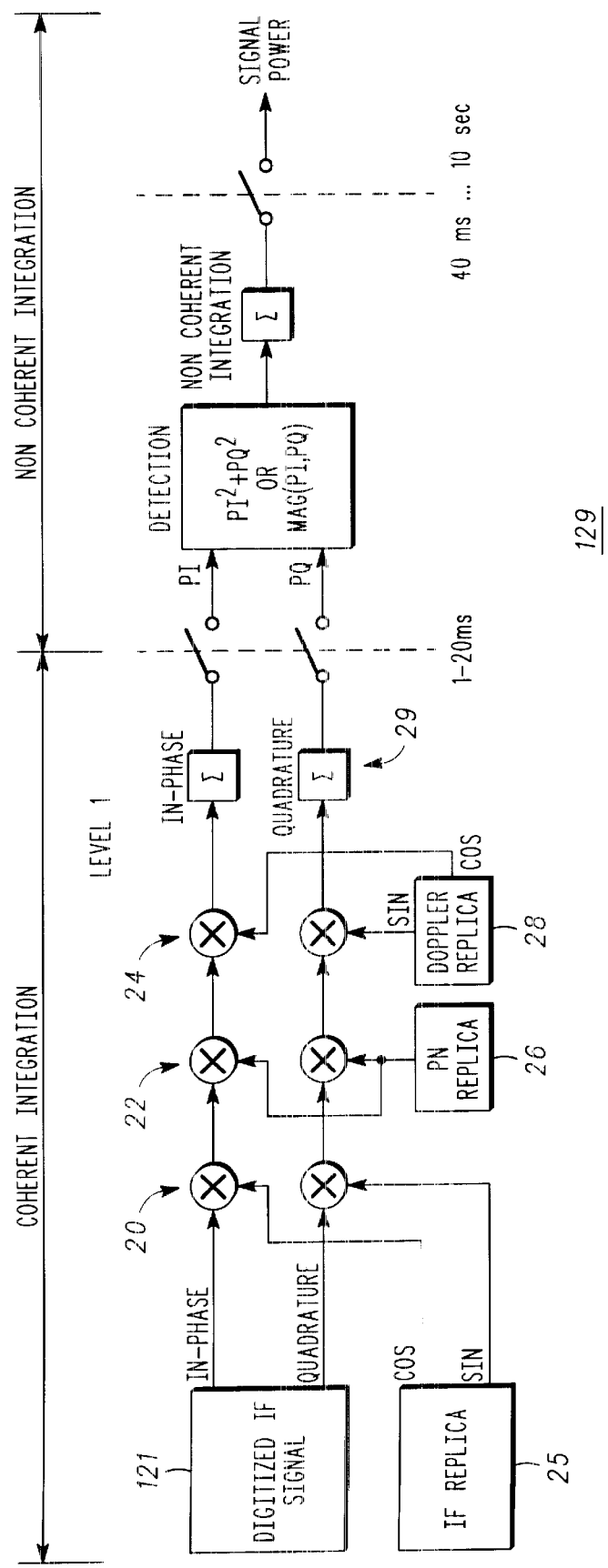
FIG. 2 is a diagram of a first embodiment of an integration/correlation block the receiver of FIG. 1.

The present invention solves the problem of oscillator frequency error correction in an assisted GPS handset. Precise frequency information enables use of narrower Doppler search windows, which permits use of longer coherent integration intervals in the correlator 129, and thereby signal detection at lower signal-to-noise ratios. As with any type of receiver, a GPS receiver needs to tune itself to receive the desired signal. The tuning process for GPS is a two-dimensional process covering code phase and Doppler space. This process is performed in the apparatus shown in FIG. 2, illustrated by the digitized IF signal source 121 (in phase and quadrature components), a pair of IF mixers 20, a pair of PN sequence mixers 22 (code phase dimension), and a pair of Doppler mixers 24 (Doppler dimension).

For the code phase dimension, the receiver creates a replica pseudo-random noise sequence 26 and synchronizes the PN sequence with the received signal. Little signal energy is observed at the correlator output until the transmitted signal sequence is aligned with a locally generated copy of the same code. This process is called de-spreading the transmitted code. Likewise, the receiver must generate a duplicate Doppler signal 28 that matches the satellite motion induced signal Doppler component. When the received signal and the replica signal match in frequency, it is said to be in zero-beat. The receiver mixes or multiplies the received signal with the replica signal 25. After dispreading, the output of the multiplier contains a signal that contains two components. One of the components consists of a signal for which the frequency is the sum of the received signal frequency and the replica signal frequency, while the other component consists of the difference of the received signal frequency and the replica signal frequency. A low pass filter 29 is generally used to filter out the PLUS component, leaving the MINUS component only. When the local replica signal frequency matches the received signal frequency, a zero beat condition is said to exist and the only signal remaining is the 50 BPS signal modulation.

In GPS spread spectrum systems, signal processing gain can be achieved through some combination of coherent and non-coherent integration. SNR improvement is achieved with coherent integration because the signal component contains a non-zero magnitude that, when added over many samples, increases in magnitude proportional to the coherent integration time. The noise present on the signal (zero mean), when coherently integrated, increases proportionally by the square root of the integration time. Over a long integration period, the noise, because of its zero mean, sums to zero, making the small signal appear above the noise level. The noise component has a mean value of zero while the signal component has a small but non-zero mean (after dispreading). Thus, the zero-noise mean is approached as one integrates for a long period of time allowing the non-zero signal to grow above the integrated noise level. The net result is that the signal to noise is improved dependent on the integration period.

GPS receivers generally use integrate-and-dump (I&D) filters to mechanize the low pass filter function, which provide the added benefit of providing the integrator for the above mentioned signal processing gain. The I&D filter is an efficient filter implementation because all that is required is to add the signal for a period of time, T. The input-to-output filter response of an integrate and dump filter as a function of the input signal frequency (f) can be written as:

$$G(f) = \frac{\sin\left(\frac{\pi Tf}{2}\right)}{\left(\frac{\pi Tf}{2}\right)}$$

where T is the integrate and dump time interval in seconds, and f is the signal frequency in Hz.

In such a filter, frequencies which are equal, or are nearly equal to the sum of the IF replica frequency (element 25 in FIG. 2) and the Doppler replica frequency (element 28 in FIG. 2) are not attenuated (G(0)=1), while frequencies that are offset by 1/T from the sum of the IF replica frequency and the Doppler replica frequency create a zero output (complete attenuation). In fact, any frequency that is offset by N/T from the IF plus Doppler replica, where N is any integer, creates a zero output of the filter. The shape of this equation is that of a classic |sin(x)/x| shape depicted in FIG. 3.

Coherent integration refers to the process of maintaining in-phase and quadrature data paths while integrating. FIG. 2 shows the portion of coherent integration (I and Q signals are maintained), followed by a signal detector, which is then followed by a portion of non-coherent integration. There are special limitations when dealing with GPS signals that limit the period of time by which coherent integration is practical. The first limit reached is caused by the signal itself. Since the signal structure is bi-phase modulated with a 50 bit-per-second sequence (duration of each bit is 20 milliseconds), it is impractical to integrate coherently by more than 20 milliseconds because the data bit transitions themselves will cause signal cancellation across an integration boundary. Best results (most signal gain) are achieved by having a coherent integration period that is 20 milliseconds long, and the integration period synchronized with the 50 BPS data edges (i.e., the integration start and stop events are synchronized to the data bit edges, allowing maximum gain to be achieved). The time of arrival of the data bit edge can be measured easily by a method such as a bit-sync detector or by an early-late gate bit synchronizer, as are known in the art.

Figure 4:
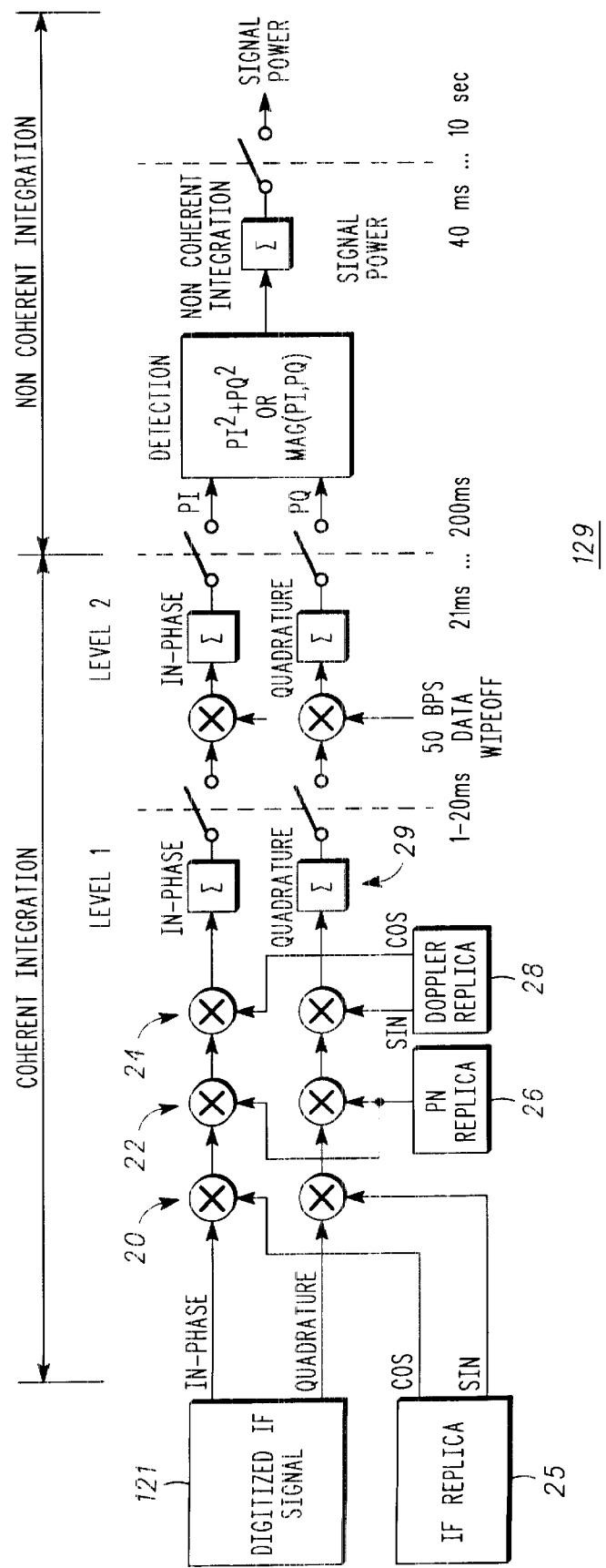
FIG. 4 is a diagram of a second embodiment of an integration/correlation block in the receiver of FIG. 1.

It is possible to extend the coherent integration period beyond the 20 ms data modulation period by having prior knowledge of the 50 BPS data sequence and applying the data pattern subsequently as shown in FIG. 4, where the 50 BPS data pattern multiplies the first coherent integration data (summed to 20 milliseconds) by +1 or −1 dependent on the data sequence. The net effect is to wipe-off the 50 BPS data modulation and allow coherent integration to continue beyond the 20 ms limit previously discussed.

In both cases, some period of time is used for coherent integration, called the PDI. The minimum period of time for coherent integration is the one millisecond repeat time of the PN code. Thus, one millisecond is a lower limit and 20 ms is an upper limit if the 50 BPS data sequence is not known.

Figure 3:
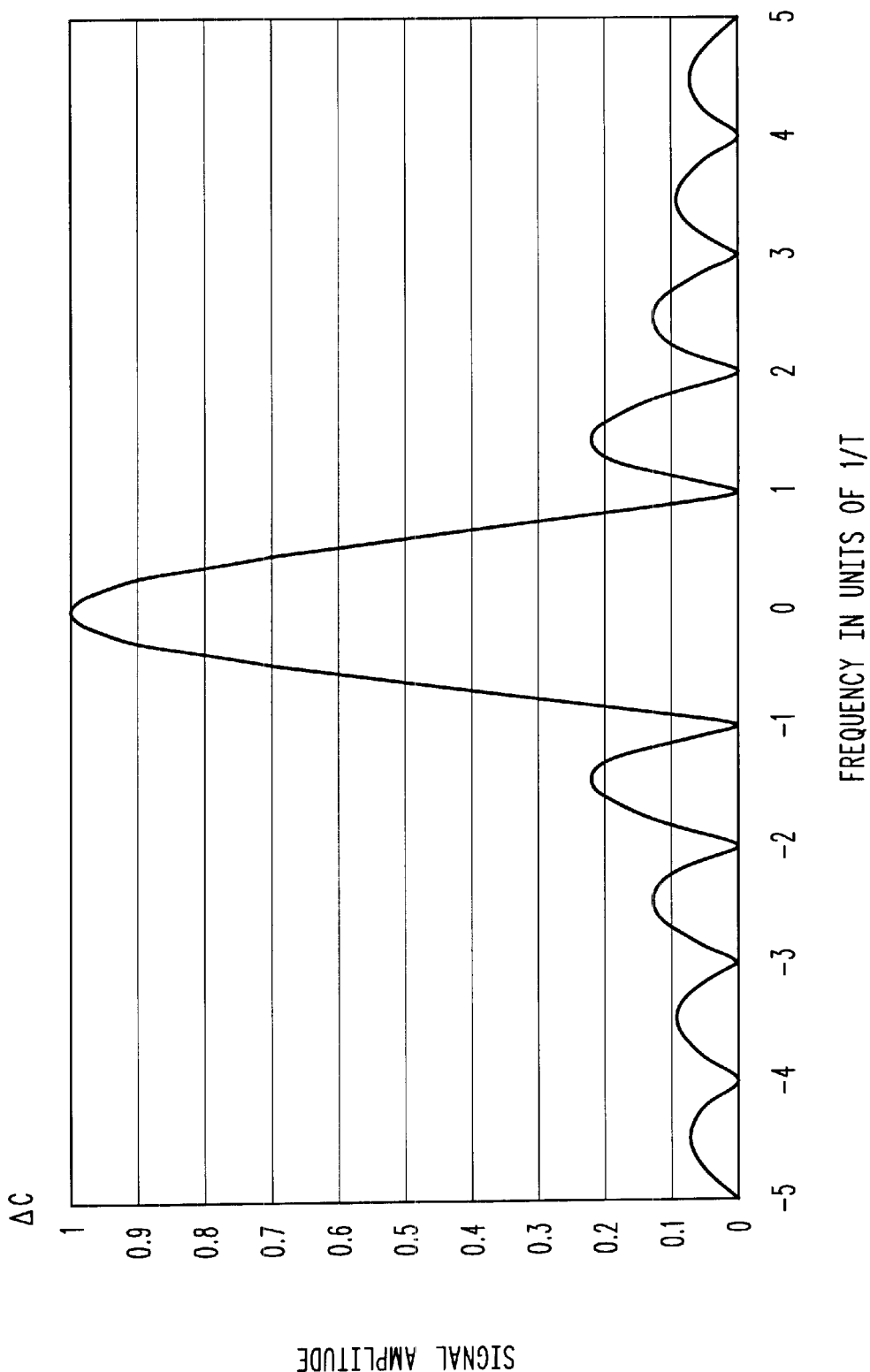
FIG. 3 is a graphical representation of a Doppler error modulation, in accordance with the present invention.

In FIG. 3, with an integration time T of one millisecond, the bandwidth between the first nulls is one kHz wide, allowing for a relatively large oscillator uncertainty. For example, CDMA reference oscillators are know to within 0.05 PPM, or 75 Hz at L-band. One kHz bandwidth easily accepts the GPS signal within the bandwidth. However, with T=13 msecs, for example, the signal processing gain is reduced by 5 dB by the Doppler error, making it difficult to detect signals in weak conditions.

With T of 20 milliseconds, the bandwidth of the first lobe is only 50 Hz, making it impossible to cover the 75 Hz uncertainty with only one Doppler bin. Thus, there is a trade-off between signal processing gain and bandwidth due to the coherent integration period that must be managed optimally to avoid having to create many Doppler bins which implies an increased number of integrators.

Frequency locking to a precision carrier signal of the cellular infrastructure, or sharing the radiotelephone's oscillator, as used previously, removes much of the error associated with the oscillator used to acquire the GPS signals, but is not sufficient to support very long coherent integrations without resort to multiple Doppler bins (increasing the required number of correlators). Residual oscillator error remains the dominant source of Doppler error, in common across all GPS satellites, after the assistance data removes most of the Doppler contribution associated with the GPS satellite motion. For example, use of an oscillator which is locked to the stable reference associated with CDMA will be accurate to 0.05 parts-per-million (ppm). The corresponding frequency error of 75 Hz will not permit integrations longer than 13 milliseconds, which is less than one navigation data bit period (20 ms). It is highly desirable, if not a requirement, to use coherent integrations as long as one bit period (this can be done if the bit boundaries are predicted using the assistance information), and, further, to integrate over multiple bit periods (e.g., 200 msecs) when the bit sequence has been supplied or can be predicted.

For GSM and iDEN applications, the problem is made worse, and Doppler correction is even more critical for efficient correlator usage. GSM frequency stability is 0.10 ppm, which limits coherent integration to roughly six milliseconds, and for iDEN, the longest permissible integration interval without the use of multiple Doppler bins is only three milliseconds. Because of the expected degradation in signal-to-noise ratio relative to conventional GPS receivers, conventional approaches for estimating frequency error, e.g., use of an average frequency error discriminator (as could be used in a conventional frequency locked loop), or examination of code phase changes over a period of time, will not work reliably.

Figure 5:
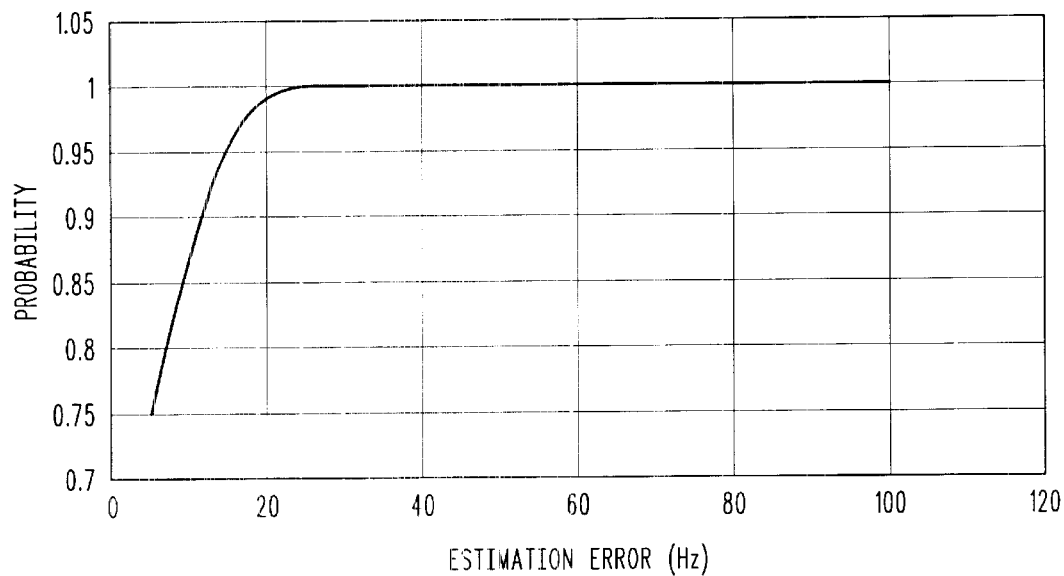
FIG. 5 is a graphical representation of prior frequency estimator performance with high signal-to-noise.
Figure 6:
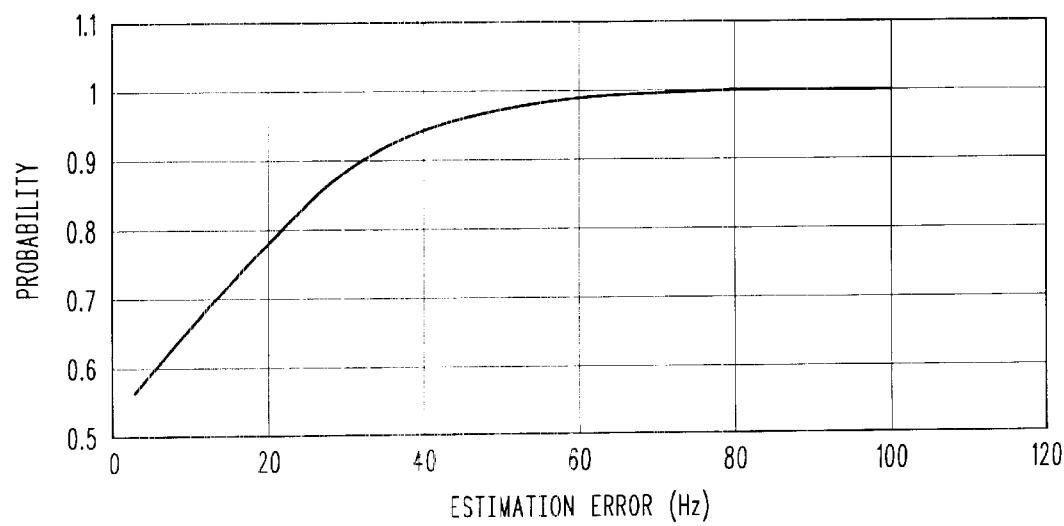
FIG. 6 is a graphical representation of prior frequency estimator performance with low signal-to-noise.

A Cumulative Distribution Function (CDF) curve for use of an averaged (and normalized) frequency error discriminator approach appears in FIGS. 5 and 6. The curve appearing as FIG. 5 represents a relatively strong signal, as could be characterized by a handset in an "open" signal environment: performance is adequate, as more than 99% of all cases correspond to a frequency error less than 25 Hz, permitting extended coherent integration equal to one bit period. FIG. 6 presents the results for a 10 dB loss relative to FIG. 5, and only 82% of the cases permit coherent integration of one data bit period. It is evident that an alternative approach is required at signal to noise ratios below 30 dB-Hz for reasonable averaging times (e.g., less than three seconds). Similarly, using typical resolutions associated with acquired code phase estimates (e.g., 0.0625 chip), reliable Doppler error estimation, based upon simply averaging the frequency error discriminator typically used in GPS frequency tracking loops at lower signal to noise ratios, dictates an excessively long integration time (e.g., more than 30 seconds for a 25 Hz residual Doppler error).

The present invention provides a Doppler correction method for correcting reference oscillator frequency error which operates effectively at lower signal to noise ratios, and does not require at unacceptably long period of integration time. In its simplest embodiment, the present invention requires: acquisition of at least one GPS signal, and computation of Doppler error for the acquired satellite.

Acquisition of at least one GPS signal is required to determine the frequency error. Since the GPS assistance data is assumed to consist of an ephemeris for the visible satellites and a coarse location, the oscillator frequency error is dominant (and common across all satellites). Therefore, the oscillator error estimate can be based upon only a single satellite. If additional satellites have been acquired, the individual Doppler estimates should be weighted and combined to improve the estimate of the Doppler error. In this case, use of a Weighted Least Squares (WLS) estimator is preferred for the combination, with the weights computed from a statistic associated with each Doppler extraction which represents the confidence in the Doppler error estimate derived for that satellite, as will be described below.

Once the satellite is acquired, an improved code phase estimate is constructed from the largest magnitude and next largest magnitude signal envelope accumulations from the correlator. These largest magnitudes correlation can be weighted in determining the best estimate of the code phase, as given by $$CP_{est} = w_1 CP_{est1} + w_2 CP_{est2}$$

where $CP_{est1}$ is the code phase estimate corresponding to the largest accumulated signal envelope, $CP_{est2}$ is the code phase estimate corresponding to the next largest accumulated signal envelope, $w_1 = E_1/E_{sum}$, and $w_2 = E_2/E_{sum}$, where $E_1$ is the largest accumulated signal envelope, and $E_2$ is the next largest accumulated signal envelope, with $E_{sum} = E_1 + E_2$. Further refinements to the code phase estimate are possible, and involve using narrower spacings of code phase than were used for initial acquisition (e.g., one-eighth chip spacing versus one-half or full-chip spacing). These refinements have the effect of ensuring that the code phase estimate is closer to the actual Auto Correlation Function (ACF) peak, and so can be expected to improve the performance of the Doppler estimation in lower signal-to-noise ratio environments. The code phase estimate may also be determined using a curve fit process, wherein a representation of an ideal ACF function is fit to the measured correlation data, in a Least Squares (LS) or Weighted Least Squares (WLS) sense. The ability to estimate Doppler error at low signal-to-noise ratio is enhanced by achieving a more accurate code phase estimate.

Given acquisition of one or more signals, and construction of a refined code phase estimate, Doppler error estimation can proceed for each acquired satellite. The present invention exploits the known characteristic of the Doppler error modulation (as represented in FIG. 3), i.e., a term involving the factor $\sin(\pi T f/2)/(\pi T f/2)$, where T is the coherent integration interval, and $f$ is the frequency error to be solved for. In order to do this, signal correlations must be developed at the best estimate of code phase ($CP_{est}$, as given by the equation above) for multiple Doppler estimates (i.e., multiple Doppler bins), centered at the estimate of Doppler for which the signal was initially detected (i.e., the Doppler estimate corresponding to $CP_{est1}$ and $CP_{est2}$). The number of Doppler estimates is a function of the total Doppler uncertainty and the accuracy desired.

Figure 7:
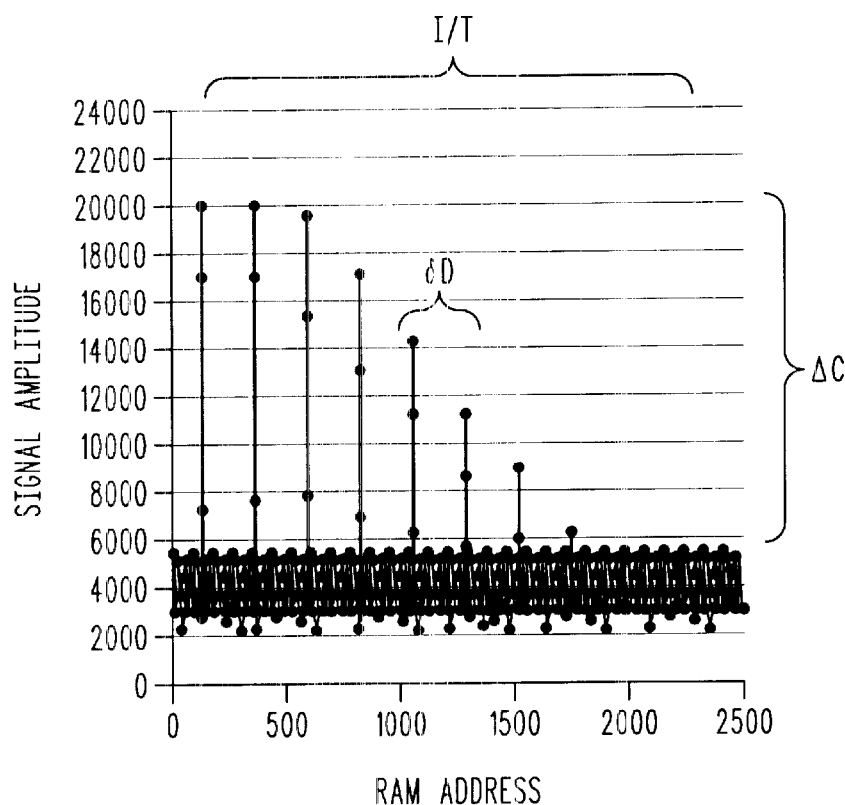
FIG. 7 is a graphical representation of correlation magnitudes at multiple Doppler estimates, in accordance with the present invention.

For example, if the initial acquisition occurred with a Doppler bin width of 75 Hz (the minimum value required for a CDMA quality reference oscillator), and a refinement to this Doppler estimate (i.e., the Doppler estimate corresponding to the midpoint of the Doppler bin in which the signal was detected) is required which is accurate to 25 Hz, then a new set of correlations will be developed at the code phase estimate which produced the initial detection using seven Doppler bins, as shown in FIG. 7. One Doppler bin will be centered at the original estimate, denoted $D_0$, then at $D_0+25$ Hz, $D_0-25$ Hz, $D_0+50$ Hz, etc., until the frequency uncertainty space is spanned. Once this new set of correlation magnitudes are generated, the present invention can be applied to determine an improved Doppler estimate.

FIG. 7 is an example illustrating the pattern of correlation outputs, at multiple Doppler estimates (bins), for a fixed range of code phase space at which the GPS signal was detected within the code phase test range. Note that a $\sin(x)/x$ envelope is produced having seven distinct correlation peaks with differing magnitudes, that can be observed above the noise floor. Each peak corresponds to a different Doppler estimate. The difference between the maximum and minimum correlations defines the peak-to-null separation of the Doppler modulation.

Figure 8:
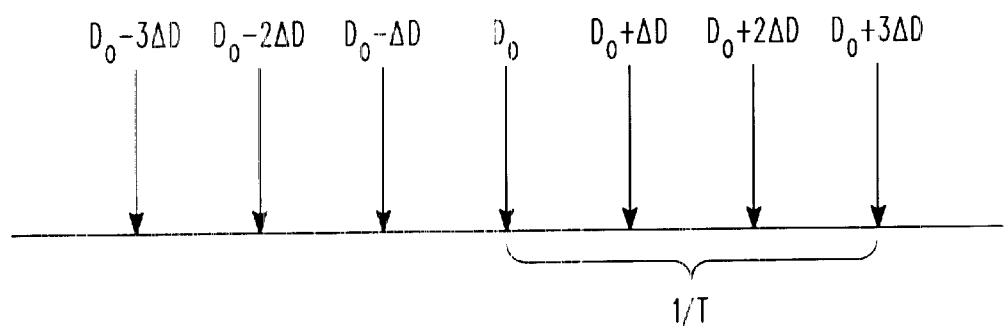
FIG. 8 is a graph illustrating Doppler estimation, in accordance with the present invention.

The coherent integration interval for this second set of accumulations at multiple Doppler bins should be set to the maximum value possible, given the specification on frequency error, and subject to the generally unknown data bit modulation: e.g., roughly 13 ms for CDMA, at which value the loss due to the frequency error modulation (i.e., $\sin((\pi T f/2)/(\pi T f/2))$ is about 5 dB for a 75 Hz frequency error. The peak which occurs in subsequent integrations will correspond to zero Doppler error, with a first minimum occurring at a (1/T) Hz offset from zero Doppler error (i.e., 75 Hz). It is this separation between the signal envelope accumulations corresponding to candidate peaks and first nulls of the Doppler error modulation which a preferred embodiment of the present invention uses as a discriminator, i.e., a search is done across accumulated signal envelope detections corresponding to pairs of Doppler offsets separated by (1/T) until it finds a maximum difference in correlations defining peak and null states. The Doppler offset used at the modulation producing the maximum difference in correlations is the frequency error. This approach is shown in FIG. 8.

The Doppler estimate which is determined from the satellite acquisition is denoted $D_0$. It becomes the center of a new Doppler search, spread over $D_0-3\Delta D$ to $D_0+3\Delta D$ in the figure, for example. Of course, more or less number of bins can be used as necessary. All correlations are accumulated at the same estimated code phase (that previously determined as $CP_{est}$). The parameter $\Delta D$ represents the desired resolution associated with the refined Doppler estimate: e.g., if the total uncertainty following acquisition is 75 Hz, then the partitioning which is illustrated produces an improved Doppler estimate with a 25 Hz resolution.

The present invention determines Doppler error by first starting with a hypothesized Doppler error ($\delta D$), i.e., the error in the original estimate $D_0$. In order to determine a best estimate for $\delta D$, trial values are considered which are multiples of the $\Delta D$ parameter of FIG. 8. For each trial value, the absolute value of the correlation difference between pairs of accumulated correlations separated by 1/T is computed, as indicated below:

$$\Delta C = |C(D) - C(D - 1/T)|$$

where D is the hypothesized or trial Doppler estimate corresponding to the adjustment $\delta D$, i.e., $D = D_0 - \delta D$. As $\delta D$ is varied from 0 to $3\Delta D$, in increments of $\Delta D$, different magnitudes of $\Delta C$ are produced. Selecting a maximum magnitude value then produces the value for $\delta D$ which most closely matches the separation between the peak and the null of the Doppler error modulation (as represented in FIGS. 3 and 7). This correction can then be used to correct the timing of the GPS device. In particular, the numerically controlled oscillator (NCO) of the radiotelephone can be corrected to improve further searches. The technique described above uses two points to define the "peak-to-null" separation in the sin x/x curve to estimate Doppler error. However, it should be recognized that there are several possible techniques for curve fitting of the Doppler error modulation to more accurately define the peak-to-null separation. Moreover, an average of the differences between the peak-to-null separations of multiple searches can be used to improve accuracy.

When each pair of correlations (i.e., C(D) and C(D−1/T)) is tested (the tests can be run in parallel or sequentially, with parallel operation preferred for speed, and sequential preferred for correlator economy), the absolute values of the differences in the accumulated envelopes are saved for determination of the largest and next largest differences. The largest value of $\Delta C$, as explained above, produces the best estimate for the correction to $D_0$. Depending on the separation in magnitude and frequency of the largest and next largest saved differences, a confidence level is associated with the Doppler correction: if the largest and next largest values correspond to neighboring Doppler offsets (as they should, owing to the nature of the Doppler error modulation sin x/x behavior, confidence in the estimator is high, and a weighted Doppler correction is found from the two Doppler offsets and the respective difference magnitudes. On the other hand, if the largest and next largest correspond to very different Doppler offsets, the estimate is questionable, and a decision needs to be made to either abandon Doppler estimation completely, or continue integration until the test produces a more favorable result or an alternate satellite is acquired which can be used to correct Doppler.

If more than a single satellite is initially acquired, a weighted average from among the individual Doppler estimates is performed, with the weights derived from the confidence associated with each estimate. Further, since each estimate should be dominated by the common oscillator offset, a consistency test is applied to each satellite's estimate before it is used in the combined solution. Finally, if a sufficient number of estimates are inconsistent, the Doppler estimation may again either be completely abandoned or suspended pending longer integration.

Figure 9:
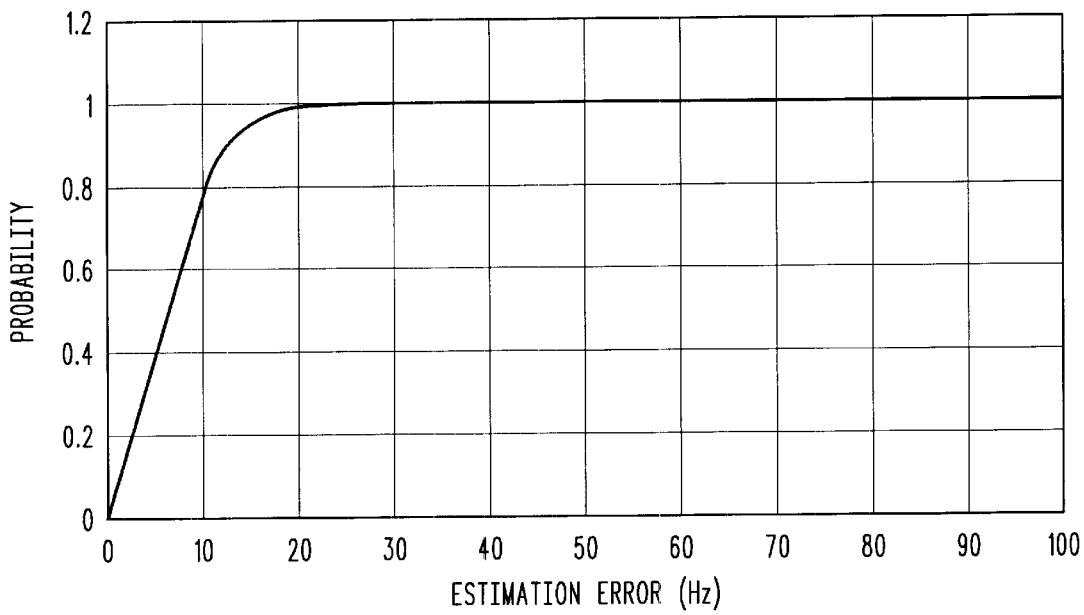
FIG. 9 is a graphical representation of frequency estimator performance with high signal-to-noise, in accordance with the present invention.
Figure 10:
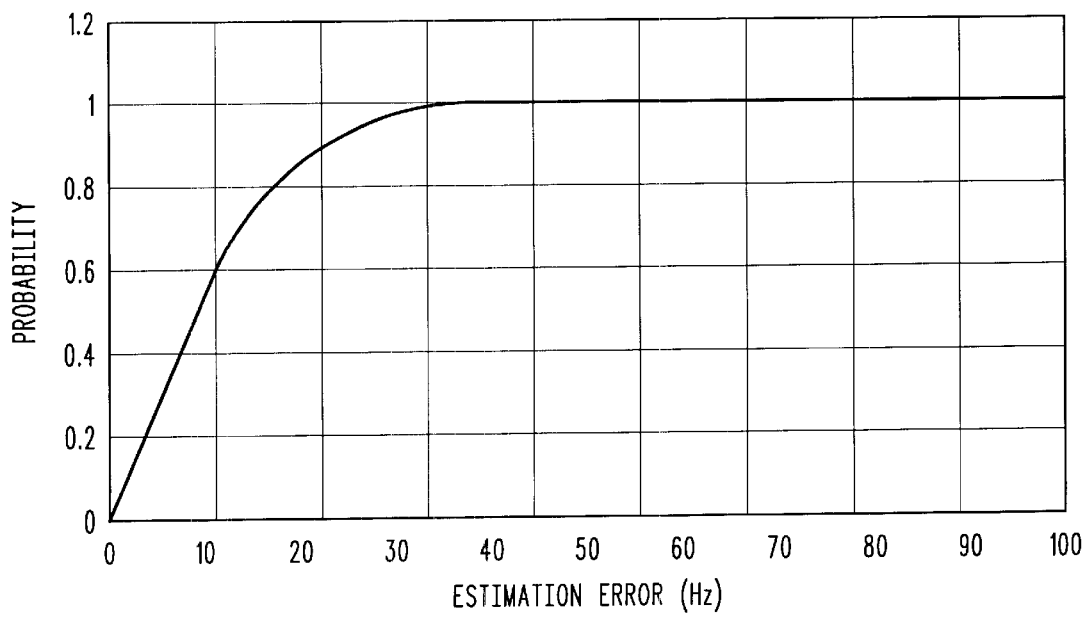
FIG. 10 is a graphical representation of frequency estimator performance with low signal-to-noise, in accordance with the present invention.

A simulation of the invention was performed, as was done with the prior art approaches in FIGS. 5 and 6. Sample results are provided in FIGS. 9 and 10, with FIG. 9 corresponding to the higher signal to noise ratio in FIG. 5, but using only a one second average integration (i.e., three times faster). The result in FIG. 10 (where the averaged cross-product detector did not meet requirements, even using a three second averaging time) corresponds to an adaptive integration time strategy, which uses one second, unless the reliability test fails. When a failure of the reliability test occurs, the integration time is extended, first to two seconds, and then to three seconds. For the results in FIG. 10, the integration interval was extended in roughly 25% of the cases, with less than 10% of the cases requiring three seconds. Doppler error is within acceptable limits (i.e., 25 Hz) in more than 95% of the cases. The corresponding error for prior art is 50 Hz (from FIG. 6).

Figure 11:
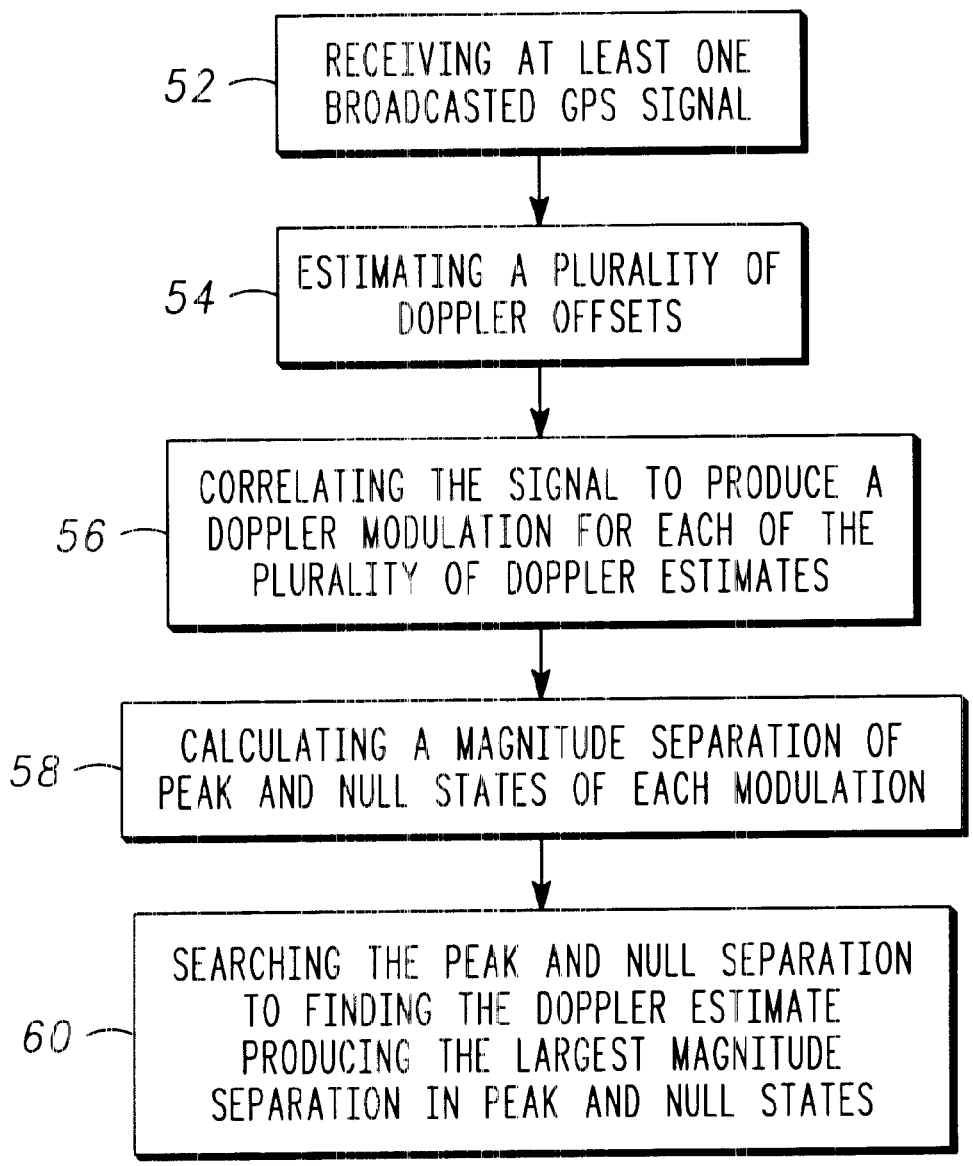
FIG. 11 is a flow chart of a method, in accordance with the present invention.

In operation, the present invention as described in FIG. 11 provides a method 50 of correcting oscillator frequency error in GPS signal acquisition. The method includes a first step 52 of receiving or acquiring at least one GPS signal. Preferably, a next step is constructing a code phase estimate from a signal envelope accumulation correlation. More preferably, the code phase estimate is constructed from the largest magnitude and next largest magnitude signal envelope accumulations from the correlator, as given by $CP_{est} = w_1 \, CP_{est1} + w_2 \, CP_{est2}$, where $CP_{est1}$ is the code phase estimate corresponding to the largest accumulated signal envelope, $CP_{est2}$ is the code phase estimate corresponding to the next largest accumulated signal envelope, $w_1 = E_1/E_{sum}$, and $w_2 = E_2/E_{sum}$, where $E_1$ is the largest accumulated signal envelope, and $E_2$ is the next largest accumulated signal envelope, with $E_{sum} = E_1 + E_2$. Further refinements to the code phase estimate involve narrowing the spacings of searched code phase than were used for initial acquisition, or basing it upon a curve fit to a representation of an ideal ACF function.

A next step 54 includes estimating a plurality of Doppler offsets. A next step 56 includes correlating the signal envelope to produce plurality of correlation results for each of the plurality of Doppler estimates to determine a Doppler modulation. The correlations follow a Doppler modulation envelope $\sin(((\pi T f/2)/(\pi T f/2))$, where T is the coherent integration interval, and $f$ is the frequency error to be solved for. Preferably, the Doppler estimates are centered at the estimate of Doppler using the code phase estimate from the constructing step. The number of Doppler estimates depends on the Doppler uncertainty (bin width) and the accuracy desired. A next step 58 includes calculating a magnitude separation (difference) between a peak and null states of the Doppler error modulation envelope at each Doppler estimate. A next step 60 is searching the peak and null separation to finding the Doppler estimate producing the largest magnitude separation in peak and null states. The Doppler estimate that produces the largest magnitude separation between the peak and null states of the modulation defines the Doppler (frequency) error for the at least one broadcasted GPS signal. In practice, producing a smooth modulation curve is impractical due to the number of calculations that would be involved. Therefore, individual correlation results are used as an estimate of the sin(x)/x curve of the modulation.

In one embodiment, the separation between the peak and null of the Doppler modulation is calculated by the magnitude difference between the maximum and minimum correlations ($\Delta C$ in FIG. 7) that correspond to the peak and null states of the curve. The minimum (null) occurs at a (1/T) Hz offset from zero Doppler error. Preferably, a search is performed across all accumulated signal envelope detections until a maximum difference in correlation magnitude defining peak and null states is found. In practice, a search is performed across each pair of accumulated signal envelope detections of Doppler estimates (separated by 1/T) until a maximum difference in correlations defining peak and null states is found, as explained above.

In another embodiment, the separation between the peak and null of the Doppler modulation is calculated by curve fitting the correlations to a sin(x)/x curve and finding a difference between the peak and any null of the curve. Preferably, the peak and first null ($\Delta C$ in FIG. 7A) is taken. A last step of the method includes correct the timing of the GPS device using the frequency error.

In still another embodiment of the invention, the Doppler curve fit uses points other than the peak and the null of the Doppler error modulation: e.g., the peak and its two neighbors could be used to fit the measured correlation data. This alternate embodiment is configured as a two dimensional curve fit to the measured correlation data, as described below: hence, a minimum of two samples of the correlation magnitudes are required to determine the fit. In order to derive a fit which is optimum, in some sense, the curve fit problem is represented as a Least Squares (LS) process (note that, although use of a Weighted Least Squares (WLS) approach is generally preferred, the noise samples corresponding to each Doppler offset is identical, and so produces a singular case for the WLS solution). The following linear model is used based on a least squares process is used:

$$m_{res} = Hx + v$$

where $m_{res}$ denotes the vector of correlation magnitudes residuals at the multiple Doppler offsets (at least 2, but preferably 3, comprised of the peak Doppler value and its neighbors), H is the 3×2 measurement gradient matrix, x is the two dimensional correction vector (its components representing the Doppler error, and a correction to the peak of the assumed sin x/x curve), and v is the three dimensional noise vector (comprised of identical noise components for each measurement). The vector $m_{res}$ is found by subtracting estimated correlation magnitudes from the measured correlations. The estimated magnitudes are found initially by assuming that the initial correlation magnitude peak corresponds to zero Doppler error. The measurement gradient values are found as the partial derivatives of the sin x/x curve at the assumed Doppler offset values. Given the linear model, development of a LS solution proceeds in a straightforward manner, with the solution (found from the well known pseudo-inverse matrix) mechanized in a loop, with convergence to a solution determined when the LS corrections become insignificant. In each loop iteration, the Doppler and peak correction values embedded in x are used to correct the assumed Doppler offset values, the measurement gradient matrix elements, and the magnitude residual vector.

An improved GPS signal acquisition method and system has been detailed. By improving oscillator accuracy weak signals can be detected. The signal detection improvement is of the present invention is realized using the separation between the peak and null levels of the Doppler error modulation to derive a correction which can operate at low signal-to-noise ratios. Alternate embodiments of the technique, which operate on different combinations of peak and null values, are possible. Further alternate embodiments are based on a curve fit to other samples of the Doppler error modulation, e.g., the peak and its neighbors. Advantageously, the potential applications for use of this invention are any applications which require handset based location using GPS, either as a sole source for positioning, or in combination with terrestrial measurements derived from the cellular infrastructure. By applying all of the described techniques position determining data can be typically acquired within a few seconds rather than tens of seconds, even in weak signal areas. This allows for energy conservation, which is an important feature in portable devices, and makes E911 service viable in a portable product.

What is claimed is:

1. A method for correcting oscillator frequency error in GPS signal acquisition, comprising the steps of:

receiving at least one broadcasted GPS signal;

estimating a plurality of Doppler offsets;

correlating the signal to produce a plurality of correlation results for each of the plurality of Doppler estimates;

calculating a magnitude separation of peak and null states of corresponding pairs of correlation results; and searching the peak and null separation to find the Doppler estimate producing the largest magnitude separation in peak and null states, the found Doppler estimate defining a frequency error estimate for the at least one broadcasted GPS signal.

2. The method of claim 1, further comprising the step of constructing a code phase estimate from a signal envelope accumulation.

3. The method of claim 1, further comprising the step of constructing a code phase estimate from a largest and next largest signal envelope accumulations.

4. The method of claim 3, wherein constructing the code phase estimate is defined by $CP_{est} = w_1 CP_{est1} + w_2 CP_{est2}$, where $CP_{est1}$ is the code phase estimate corresponding to the largest accumulated signal envelope, $CP_{est2}$ is the code phase estimate corresponding to the next largest accumulated signal envelope, $w_1 = E_1/E_{sum}$, and $w_2 = E_2/E_{sum}$, where $E_1$ is the largest accumulated signal envelope, and $E_2$ is the next largest accumulated signal envelope, with $E_{sum} = E_1 + E_2$.

5. The method of claim 1, further comprising the step of constructing a code phase estimate from at least one signal envelope accumulation using a narrower spacing of code phase for the at least one signal envelope accumulation than is used for the initial acquisition of the broadcasted GPS signal in the receiving step.

6. The method of claim 1, further comprising the step of constructing a code phase estimate from an autocorrelation function curve fit.

7. The method of claim 1, wherein the correlating step provides correlation magnitudes that follow a sin(x)/x curve, and wherein in the calculating step the separation is estimated by a magnitude difference between the maximum and minimum correlations corresponding to the peak and null states of the curve.

8. The method of claim 7, wherein the searching step includes searching across pairs of accumulated signal envelope detections of Doppler estimates (separated by 1/T) until the maximum difference is found.

9. The method of claim 7, wherein the correlating step provides curve fitting the correlation magnitudes to a sin(x)/x curve using at least two correlation magnitudes.

10. The method of claim 1, further comprising the step of applying the frequency error estimate to an oscillator frequency of a GPS device to correct for the oscillator frequency error.

11. The method of claim 1, wherein the receiving step includes receiving a plurality of broadcasted GPS signals, and the correlating step includes determining an average of the Doppler error estimates of each signal to provide a Doppler error modulation.

12. The method of claim 11, wherein the average in the correlating step is a weighted-least-squares estimation.

13. The method of claim 1, wherein the receiving step includes receiving a plurality of broadcasted GPS signals, and the correlating step includes determining an average of a Doppler error modulation.

14. The method of claim 13, wherein the confidence level in the searching step is determined from the closeness in the peak and null levels of the largest and next largest separations in correlations, and wherein if the confidence level is below a threshold further comprising a step of deciding between abandoning the Doppler estimation and continuing integration until the confidence level goes above the threshold.

15. A method for correcting oscillator frequency error in GPS signal acquisition, comprising the steps of:

receiving at least one broadcasted GPS signal;

constructing a code phase estimate from a signal envelope accumulation;

estimating a plurality of Doppler offsets and centering the plurality of Doppler estimates using the code phase estimate;

correlating the signal to produce correlation magnitudes that follow a sin(x)/x curve of a Doppler modulation for each of the plurality of Doppler estimates;

calculating a magnitude separation between the maximum and minimum correlations corresponding to the peak and null states of the curve; and searching the separations to finding the Doppler estimate producing the largest magnitude separation, the found Doppler estimate defining a frequency error estimate for the at least one broadcasted GPS signal.

16. The method of claim 15, further comprising the step of constructing a code phase estimate from a largest and next largest signal envelope accumulations, and wherein constructing the code phase estimate is defined by $CP_{est} = w_1 CP_{est1} + w_2 CP_{est2}$, where $CP_{est1}$ is the code phase estimate corresponding to the largest accumulated signal envelope, $CP_{est2}$ is the code phase estimate corresponding to the next largest accumulated signal envelope, $w_1 = E_1/E_{sum}$, and $w_2 = E_2/E_{sum}$, where $E_1$ is the largest accumulated signal envelope, and $E_2$ is the next largest accumulated signal envelope, with $E_{sum} = E_1 + E_2$.

17. The method of claim 15, wherein the searching step includes searching across pairs of accumulated signal envelope detections of Doppler estimates (separated by 1/T) until the maximum difference is found.

18. The method of claim 15, wherein the correlating step provides curve fitting the correlation magnitudes to a sin(x)/x curve with an autocorrelation function using at least two correlation magnitudes.

19. The method of claim 15, further comprising the step of applying the frequency error estimate to an oscillator frequency of a GPS device to correct for the oscillator frequency error.

20. A method for correcting oscillator frequency error in GPS signal acquisition, comprising the steps of:

receiving at least one broadcasted GPS signal;

constructing a code phase estimate from a signal envelope accumulation;

estimating a plurality of Doppler offsets and centering the plurality of Doppler estimates using the code phase estimate;

correlating the signal to produce correlation magnitudes of a Doppler error modulation for each of the plurality of Doppler estimates;

curve fitting the Doppler error modulation to a $\sin(Tf/2)/(Tf/2)$ curve, where T is the coherent integration interval, and $f$ is the frequency error, using at least two correlation magnitudes; and using the shift in Doppler value of the curve fit to estimate a Doppler error defining a frequency error for the at least one broadcasted GPS signal.

* * * * *